Sept. 26, 1933.     R. N. VAN BUSKIRK     1,928,081
BRAKE
Filed April 14, 1928     3 Sheets-Sheet 1
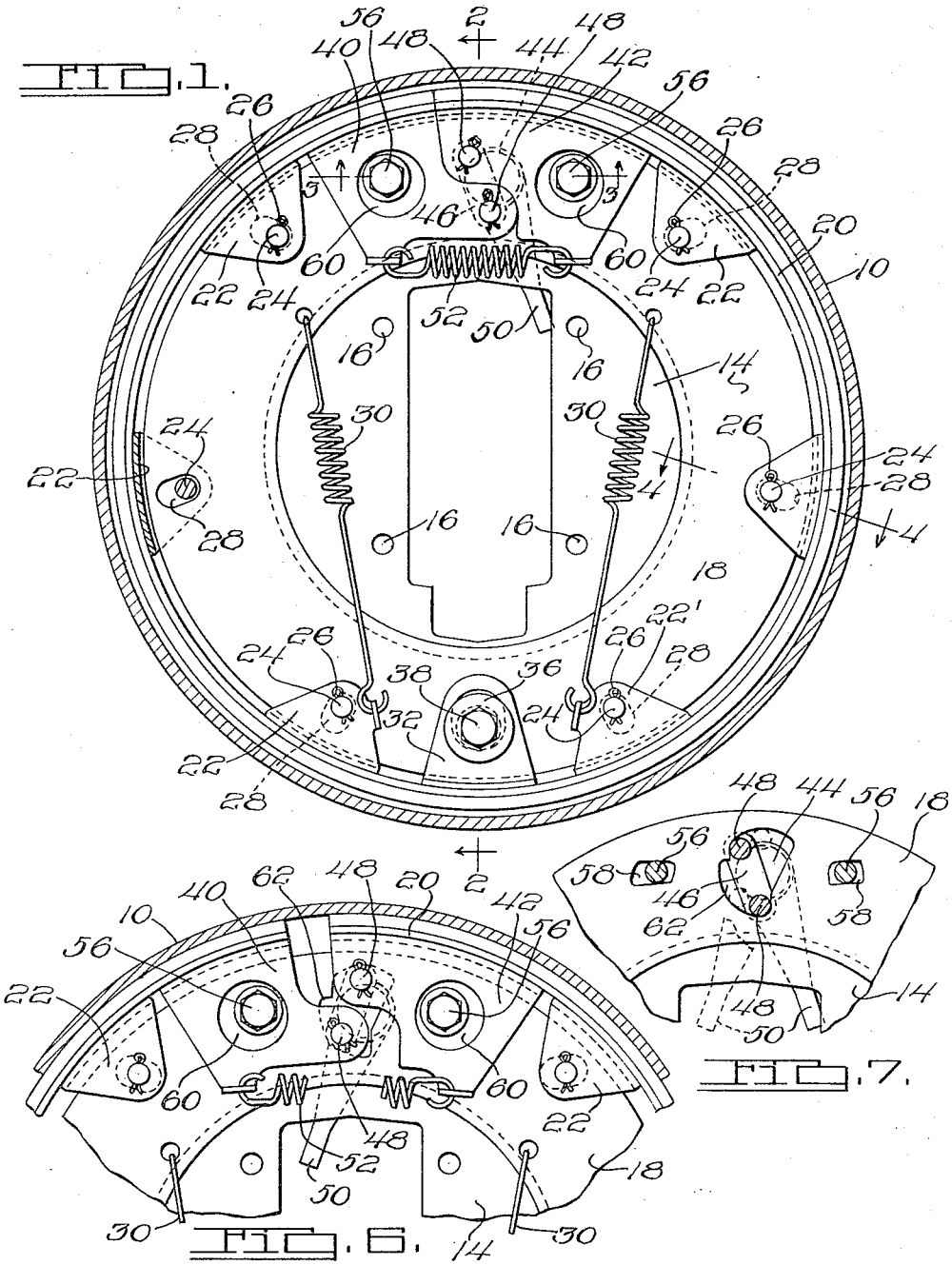
INVENTOR
Robert N. Van Buskirk
BY
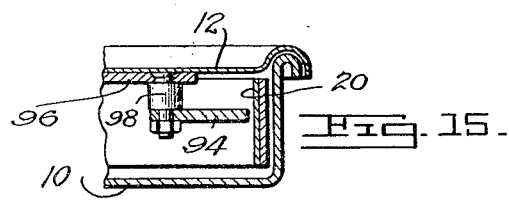
ATTORNEY Sept. 26, 1933.   R. N. VAN BUSKIRK   1,928,081
BRAKE
Filed April 14, 1928     3 Sheets-Sheet 2
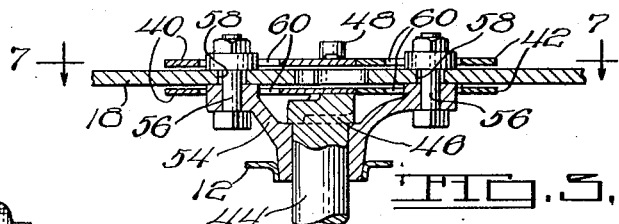
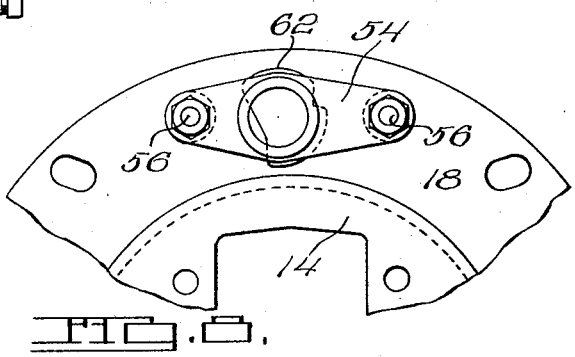
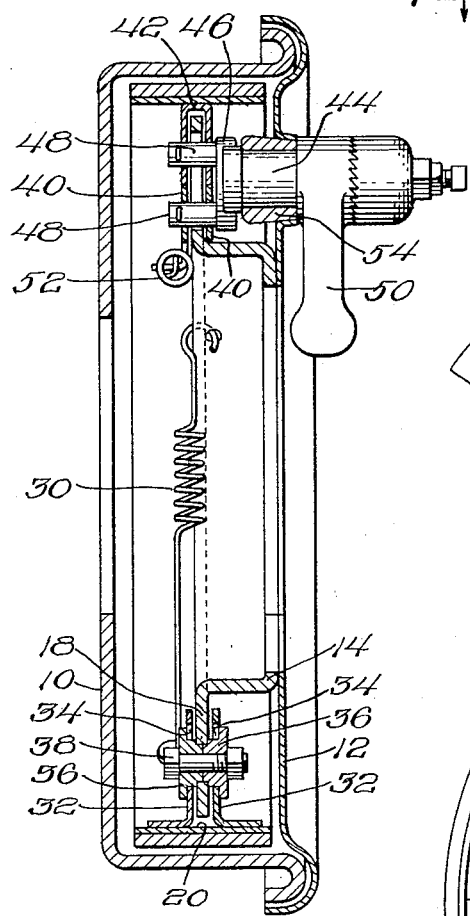
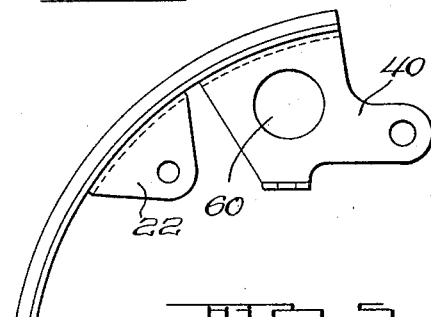
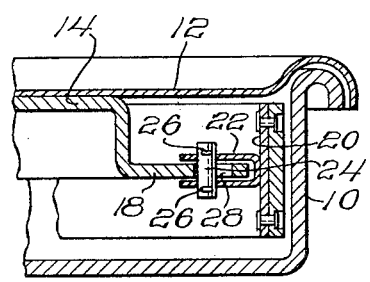
INVENTOR
*Robert N. Van Buskirk*
BY
*M. W. McConkey*
ATTORNEY

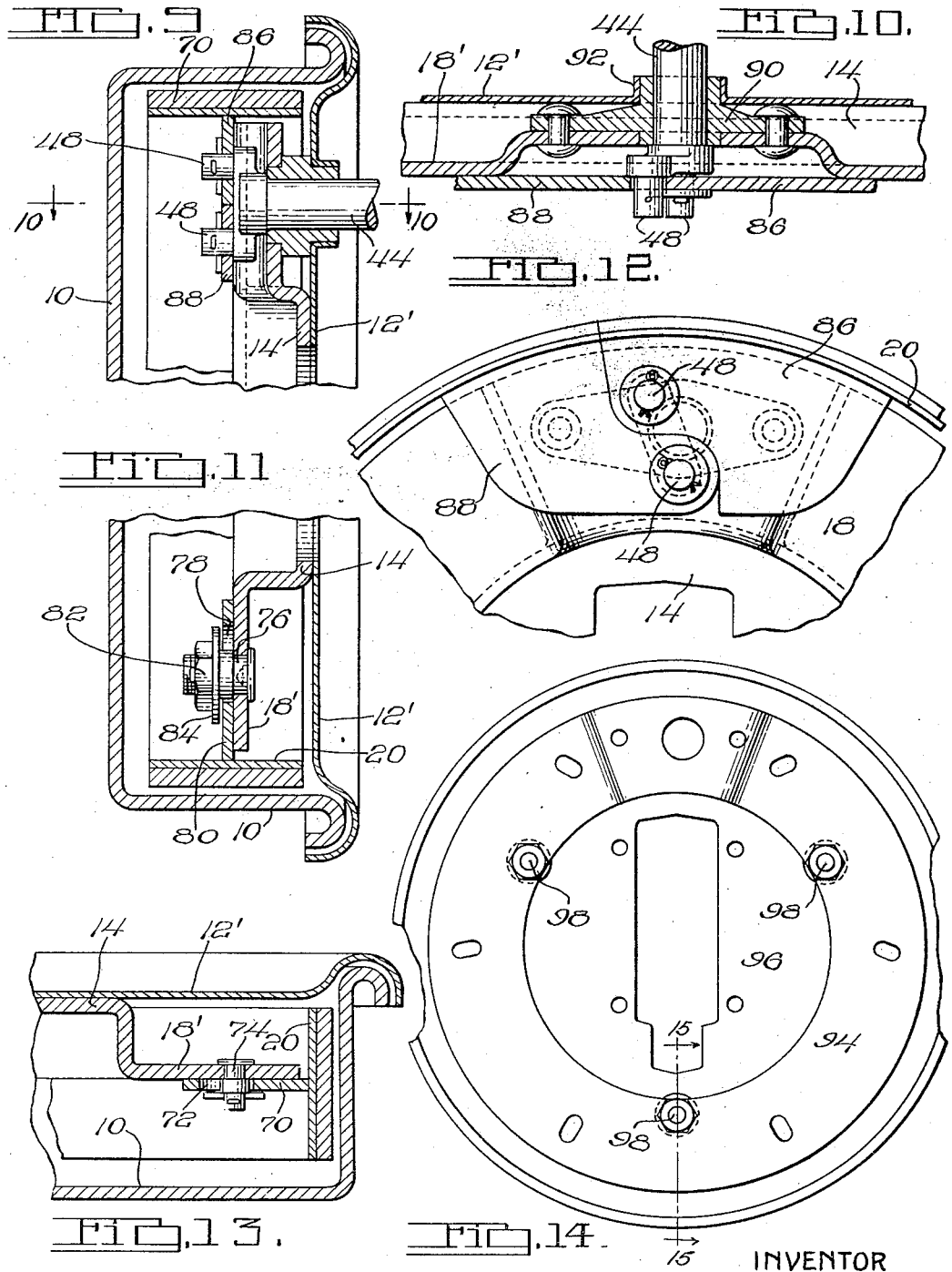

Patented Sept. 26, 1933

1,928,081

UNITED STATES PATENT OFFICE 1,928,081

BRAKE

Robert N. Van Buskirk, Detroit, Mich., assignor to Bendix Brake Company, South Bend, Ind., a corporation of Illinois Application April 14, 1928. Serial No. 270,021

10 Claims. (Cl. 188—78)

This invention relates to brakes, and is illustrated as embodied in an internal expanding automobile brake. An object of the invention is to provide a simple and very powerful brake which is inexpensive to manufacture on a large scale. Various features relate to the use of a novel brake backing plate to support and position the brake friction means when the brake is released, to an improved operating device including oppositely-arranged eccentric thrust pins shown as acting on the ends of a friction band, to simple band-positioning devices, and to other novel and desirable constructions and arrangements which will be apparent from the following description of the illustrated embodiments shown in the accompanying drawings, in which:

Figure 1 is a vertical section through the brake just inside the head of the brake drum, and showing the brake friction means in side elevation;

Figure 2 is a diametric section through the brake on the line 2—2 of Figure 1;

Figure 3 is a partial section through the operating means, on the line 3—3 of Figure 1;

Figure 4 is a partial radial section through the brake on the line 4—4 of Figure 1;

Figure 5 is a side elevation of part of the brake friction means, removed from the brake;

Figure 6 is a view corresponding to the upper part of Figure 1, but showing the brake friction means expanded against the brake drum;

Figure 7 is a partial section on the line 7—7 of Figure 3, showing a detail of the operating means;

Figure 8 is a similar view to Figure 7 but showing the operating shaft mounted in its support;

Figure 9 is a vertical diametric section, corresponding to the upper portion of Figure 2, but showing a modified brake having T-shaped rigid shoes;

Figure 10 is a section on the line 10—10 of Figure 9, showing the operating means;

Figure 11 is a vertical diametric section, corresponding to the lower portion of Figure 2, but showing the brake of Figure 9;

Figure 12 is a view corresponding to the upper portion of Figure 1, but showing the brake of Figure 9;

Figure 13 is a radial section corresponding to Figure 4, but showing the brake of Figure 9; and Figure 14 is a view corresponding to Figure 1, but with the brake friction means and the operating means removed, and showing a modified backing plate construction.

Figure 15 is a section on the line 15—15 of Figure 14 showing in detail the mounting of the backing plate.

The brake of Figures 1-8 includes a rotatable drum 10, at the open side of which are arranged a light stamping or dust plate 12 substantially closing the open side of the drum, and a heavier backing plate 14. Plates 12 and 14 may be secured together, if desired, and at any rate are preferably held by the same fastenings passing through openings 16 into the front wheel knuckle (not shown) or into a flange on the rear axle (not shown).

The backing plate 14 preferably has an annular peripheral zone or flange 18 at its outer edge which is offset substantially into the central plane of the brake, and on which the brake friction means—in this instance a continuous flexible band 20—rests when the brake is released. Band 20 may be provided with upper and lower U-shaped stampings or guides 22', welded or otherwise secured at their bases to the band and having their sides embracing the flange 18. These guides may be provided with pins 24 held by means such as cotter pins 26, and which pins pass through slots 28 in the flange 18. A pair of tension springs 30 are shown connected at their lower ends to the two lower guides 22' and at their upper ends to flange 18, and tend to urge the lower portion of band 20 away from the drum.

A pair of L-shaped stampings 32, welded or otherwise secured to the inner face of band 20 approximately at the center of the band, and arranged spaced a short distance apart and back to back, are formed with slots 34 embracing flanged rollers 36 having central hubs seated in an opening in flange 18 and held in place by a clamp bolt 38. The flanges of rollers 36 embrace stampings 32.

If the torque of the brake is to be taken at this point, the slots 34 are made equal in width to the diameter of the rollers 36, thus holding the band 20 against any except radial movement at this point. In this arrangement the rollers 36 form the anchor of the brake. If the torque is to be taken at the ends of the band, the slots 34 are somewhat wider than the diameter of the rollers. I prefer the former arrangement.

At the separable ends of the band, stamped U-shaped fittings 40 and 42 are provided. These fittings have their bottoms welded or riveted to the ends of the band, and have their sides embracing the flange 18. The brake may be applied by operating means such as a shaft 44 having a head 46 formed with offset eccentric thrust pins 48 passing through openings in fittings 40 and 42. Shaft 44 is shown as operated by a lever 50. The ends of the band are forced apart to apply the brake against the resistance of a suitable return spring 52 tensioned between fittings 40 and 42. Lever 50 is shown adjustably mounted on shaft 44 as more fully described, and as claimed, in my copending application No. 270,020, filed April 14, 1928.

Shaft 44 is journaled in a support 54 bolted to flange 18, and having the central portion in which the shaft is journaled offset from this flange to afford clearance for head 46. Bolts 56 for the support may pass through slots 58 in flange 18, and be drawn up only tightly enough to hold the support when the brake is released, thus permitting it to shift to balance the pressures on fittings 40 and 42 in case of uneven wear. Bolts 56 pass through large clearance openings 60 in fittings 40 and 42.

As will be apparent from Figures 1, 6, 7 and 8, flange 18 is formed with an irregularly-shaped opening 62 for the thrust pins 48. This opening has curved portions permitting the pins to move freely away from idle position to apply the brake, and shoulders engaging the pins in idle position and preventing them from moving in the opposite directions. It should be noted that pins 48 are not exactly diametrically disposed with respect to the axis of shaft 44, both being to the left of the shaft axis in Figure 6 for example, but are so arranged angularly of the shaft axis as to give a direct applying thrust to fittings 40 and 42.

In the arrangement of Figures 9-13, band 20 has single stampings 70 welded to its inner face, giving a T-section construction. Stampings 70 are arranged beside and in engagement with flange 18', and have slots 72 embracing guide pins 74 riveted to flange 18'. The anchor in this case is a pin 76 riveted to the flange 18 and projecting through a slot 78 in a fitting 80 carried by the band. A nut 82 threaded on pin 76 holds a washer 84 between which and flange 18 the fitting 80 is confined.

The brake is applied by engagement of the pins 48 with fittings or stampings 86 and 88 welded or otherwise secured to the ends of the band, and corresponding to fittings 40 and 42. Shaft 44 in this instance is journaled in a forged bracket 90 riveted to flange 18'. The dust plate 12' has a drawn tubular boss 92 closely fitting over a portion of this bracket.

In the arrangement of Figures 14 and 15, flange 18 is replaced by a separately-formed flat ring 94 secured to an ordinary backing plate 96 by means such as posts or studs 98.

While several illustrative embodiments have been described in detail, it is not my intention to limit the scope of the invention to those particular embodiments, or otherwise than by the terms of the appended claims.

I claim:

1. A brake comprising, in combination, a rotatable drum, an expansible friction device within the drum having separable ends, an operating shaft having two oppositely-arranged eccentric parts respectively engaging said ends and a backing plate having its edge arranged to support the band when released.

2. A brake comprising, in combination, a rotatable drum, an expansible friction device within the drum having separable ends, an operating shaft having two oppositely-arranged eccentric parts respectively engaging said ends, and a plurality of anchoring means for taking the braking torque from an intermediate portion of said device.

3. A brake having, in combination, a stationary supporting member, and an operating member having a pair of oppositely-offset eccentric pins, the supporting member having an opening through which the pins project and which permits the movement of the pins from idle position by turning the operating member in one direction but which prevents movement of said pins in the opposite direction from idle position.

4. A brake comprising, in combination, a rotatable drum, a pair of plates secured together adjacent their inner edges and one of which substantially closes the open side of the drum while the other has its outer edge approximately in the central plane of the brake, and a friction device resting on said edge when the brake is released.

5. A brake comprising, in combination, a rotatable drum, a pair of plates secured together adjacent their inner edges and one of which substantially closes the open side of the drum, and a friction device positioned by the other of the plates when the brake is released.

6. A brake backing plate having a supporting ring, secured in spaced relation thereto.

7. A brake backing plate having a supporting ring arranged in spaced relation thereto, and posts rigidly securing the ring to the plate.

8. A brake comprising a drum, a supporting plate, a band encircling and resting on said plate, parts carried by the band and straddling said plate, and an anchor member carried by the plate and projecting in opposite directions through said parts.

9. A brake comprising a plate, a band encircling said plate and having parts extending alongside said plate, an operating shaft for said band, and a shaft bearing secured to the plate by fastenings passing through openings in said parts.

10. A friction band having a series of fittings secured to its inner face and which have parallel inwardly-extending portions formed with aligned openings.

ROBERT N. VAN BUSKIRK.